(12) United States Patent
Yamamoto

(10) Patent No.: US 6,227,482 B1
(45) Date of Patent: May 8, 2001

(54) GYROSCOPE FOR REMOTE-CONTROLLED HELICOPTERS

(75) Inventor: Michio Yamamoto, Mobara (JP)

(73) Assignee: Futaba Denshi Kogyo Kabushiki Kaisha, Mobara (JP)

( * ) Notice: Subject to any disclaimer, the term of this patent is extended or adjusted under 35 U.S.C. 154(b) by 0 days.

(21) Appl. No.: 09/264,675

(22) Filed: Mar. 9, 1999

(30) Foreign Application Priority Data

Mar. 27, 1998 (JP) .................................................. 10-081122

(51) Int. Cl.$^7$ ............................ B64C 13/16; B64C 27/57
(52) U.S. Cl. ............................ 244/17.13; 244/190; 244/79
(58) Field of Search .............................. 244/17.11, 17.13, 244/76 R, 194, 195, 79, 17.19, 17.21, 190; 701/4

(56) References Cited

U.S. PATENT DOCUMENTS

| | | | |
|---|---|---|---|
| 5,025,381 | * 6/1991 | Goodzeit et al. | 244/171 |
| 5,263,662 | * 11/1993 | Fowler et al. | 244/17.13 |
| 5,291,390 | * 3/1994 | Satou | 244/76 R |
| 5,428,543 | * 6/1995 | Gold et al. | 244/17.13 |

* cited by examiner

*Primary Examiner*—Galen L. Barefoot
(74) *Attorney, Agent, or Firm*—Oblon, Spivak, McClelland, Maier & Neustadt, P.C.

(57) ABSTRACT

A gyroscope suitable for a remote-controlled helicopter is provided that can improve the control characteristics to a disturbance factor such as wind as well as the response characteristics under yaw-axis control in a correct pitch operation. The angular velocity detection signal from the yaw-axis angular velocity sensor 10 is added to the yaw-axis control signal and the angular velocity reference value from the controlling gear. The PID controller 2 receives the resultant addition signal. The control signal from the PID controller 2 is added to the correct pitch control signal and the yaw-axis control signal sent via the correct pitch to yaw-axis control mixing unit 3. The actuator 6 receives the resultant addition signal and controls the yaw-axis driving unit 7. The yaw-axis angular velocity detection sensor 10 detects the angular velocity around the yaw-axis of the airframe 9.

3 Claims, 2 Drawing Sheets

US 6,227,482 B1

GYROSCOPE FOR REMOTE-CONTROLLED HELICOPTERS

BACKGROUND OF THE INVENTION

The present invention relates to a gyroscope suitable for remote-controlled helicopters such as aerial photographing helicopters or agricultural chemicals sprinkling helicopters.

In order to manipulate a model helicopter, the gyroscope (tail stabilizer) is an auxiliary device essential for stabilizing the yaw-axis control. Without the gyroscope mounted, the helicopter horizontally yaws because of no autonomous stability function to the yaw-axis.

In the yaw-axis control operation of a model helicopter, the yaw axis is rotated under control commands from the transmitter on the controlling gear side so that the nose of the helicopter is turned in a target direction. The gyroscope stops the rotation of the yaw-axis when control commands do not come from the controlling gear side but quickly rotates the yaw-axis in response to control commands from the controlling gear side. That is, it is necessary to perform the reciprocal control. In the gyroscope configuration for a model helicopter, the rotational speed of the helicopter is detected by computing an error between a signal from an angular velocity detection sensor equipped to a model helicopter and a reference signal being a target angular velocity value. The resultant signal is transmitted to the yaw-axis control actuator on the helicopter and is subjected to feedback control to null the angular velocity of the yaw-axis.

Conventionally, the P (proportional) control system, which can provide a simplified configuration, has been employed as the feedback control method. In the P control system, the output from the controller is proportional to an error of a measurement value to a target value.

FIG. 2 is a block diagram illustrating a conventional gyroscope employing the P control system, for model helicopters. Referring to FIG. 2, reference numerals 21, 4, 5 and 8 represent addition points; 22 represents a P controller; 3 represents a correct-pitch to yaw-axis control mixing unit; 6 represents an actuator; 7 represents a yaw-axis driving unit; 9 represents an airframe; and 10 represents a yaw-axis angular velocity detection sensor.

A rate gyroscope or piezoelectric vibration type gyroscope (iezoelectric vibration type angular velocity detection sensor), for example, is used as the yaw-axis angular velocity detection sensor 10. An error between the angular velocity signal measured by the yaw-axis angular velocity detection sensor 10 and the angular velocity zero reference value is obtained at the addition point 21 and then is input to the P controller 22. The output of the P controller 22 is added to the output signal from the correct pitch to yaw-axis control mixing unit 3 at the addition point 4. Furthermore, the addition point 5 adds the resultant signal to the yaw-axis control signal and then sends the result to the actuator 6. The yaw-axis driving unit 7 varies the pitch angle of the tail rotor in response to the output from the actuator 6, thus varying the drive force around the yaw-axis.

At the virtual addition point 8, the output from the yaw-axis driving unit 7 is added to a disturbance factor such as a counterforce of the main rotor or wind. The resultant sum is sent to the airframe 9. The yaw-axis angular velocity detection sensor 10 detects the angular velocity around the yaw-axis of the airframe 9. The detected output is coupled to the addition point 21. There is a control loop (not shown in FIG. 2) by which yaw-axis control signals are provided when the operator of a wireless controlled helicopter manipulates the stick of a wireless control device to transmit remote control signals to the airframe while observing angles around the yaw-axis of the airframe 12.

In order to perform the yaw-axis control operation in the gyroscope employing the P control system, the output signal from the yaw-axis angular velocity detection sensor 10 functions as an angular velocity correction signal. The manipulation side provides a yaw-axis control signal with an opposite polarity to that of the angular velocity correction signal. The rotary motion of the yaw-axis occurs according to the resultant difference. The yaw-axis angular velocity detection sensor 10 handles a disturbance factor as the yaw-axis control signal. A rotary motion occurs proportionally to an angular velocity offset acting as the input of the P controller 22. As a result, the conventional system has the disadvantage in that it is difficult to hover the helicopter accurately because the yaw-axis shifts due to a disturbance factor such as side wind.

Recently, the PID control system built-in gyroscope for model helicopters that can cancel the offset being the drawback of the above-mentioned P control system has been commercially introduced. The PID control system performs an integration operation for integrating existing errors and then outputting the result value and a differential operation for outputting values proportional to changes in error, in addition to the proportional operation for handling the output of an adjuster as a value proportional to the error. The differential operation is not solely used but is used to improve the proportional operation and the integration operation. For that reason, in the patent specification, the P control system and the PID control system are handled as the same meaning.

It is expected that the gyroscope employing the PID control system will be widely used in future because it can cancel its offset and can provide excellent control characteristics to a disturbance factor such as wind. In the PID control system, the yaw-axis control signal from the manipulation side offsets the reference signal on the gyroscope side. In other words, the control signal acts as an angular velocity command signal.

In order to control the ascent, the descent, the ascending rate, or the descending rate of a model helicopter in the conventional manipulating system, the correct pitch operation (for changing the elevation angle at the same time) which varies the pitch angle of each of the main rotor blades is performed. In this case, a change in pitch angle causes the counter torque to the yaw-axis of the helicopter to be changed. Hence, the operator varies the pitch angle of the tail rotor according to variations in correct pitch angle to change the operation amount of the yaw-axis. That is, the mixing process ranging from the correct pitch operation to the yaw-axis operation is automatically changed. The mixing operation means that the operation amount from the manipulation side to the correct pitch operation channel is added to the yaw-axis operation channel, with a predetermined ratio and a predetermined changing characteristic provided.

In the gyroscope employing the P control system shown in FIG. 2, the correct pitch operation control signal is input to the addition point 4 via the correct-pitch to yaw-axis control signal mixing unit 3 and then to the yaw-axis control system.

However, the PID control system built-in gyroscope has the disadvantage in that since the yaw-axis control signal is handled as an angular velocity command signal, the same mixing operation as that in the P control system cannot be performed. In the PID control system, variations in counter torque can be automatically canceled under the I-control operation, without the mixing operation. However, employing only the I-control system leads to poor control response characteristics.

SUMMARY OF THE INVENTION

The present invention is made to solve the above-mentioned problems.

Moreover, the objective of the invention is to provide a gyroscope for a remote-controlled helicopter that can improve the control characteristics to disturbance factors such as wind as well as the yaw-axis control response characteristics in a correct pitch operation.

The objective of the present invention is achieved by a gyroscope suitable for a remote-controlled helicopter, wherein the yaw-axis of a remotecontrolled helicopter is subjected to PID control, comprising a PID controller having an output terminal which receives a signal obtained by mixing a correct pitch control signal of the remote-controlled helicopter with a yaw-axis control signal; whereby a variation in a counter torque to the yaw-axis due to the correct pitch can be prevented.

Hence, the present invention can improve the control characteristics to a disturbance factor such as wind under the PID control system as well as the yaw-axis control response characteristics in the correct pitch operation.

Moreover, according to the present invention, a gyroscope suitable for a remote-controlled helicopter, wherein the yaw-axis of the remote-controlled helicopter is subjected to PID control, comprises a yaw-axis angular velocity detection sensor; a PID controller; and a correct-pitch to yaw-axis mixing unit; and the PID controller inputting an error between a yaw-axis angular velocity reference value and a yaw-axis control signal and an error between the yaw axis angular velocity reference value and an output signal from the yaw-axis angular velocity detection sensor; wherein the counter torque to the yaw-axis due to the correct pitch can be prevented by outputting an output signal from the PID controller, an output signal from the mixing unit, and the yaw-axis control output signal to a yaw-axis driving system.

Hence, the present invention can improve the control characteristics to a disturbance factor such as wind under the PID control system and can easily improve the yaw-axis control response characteristics in the correct pitch operation by means of a simplified configuration.

BRIEF DESCRIPTION OF THE DRAWINGS

This and other objects, features, and advantages of the present invention will become more apparent upon a reading of the following detailed description and drawings, in which.

DETAILED DESCRIPTION OF THE PREFERRED EMBODIMENTS

An embodiment of the present invention will be described below with reference to the attached drawings.

Figure 1:
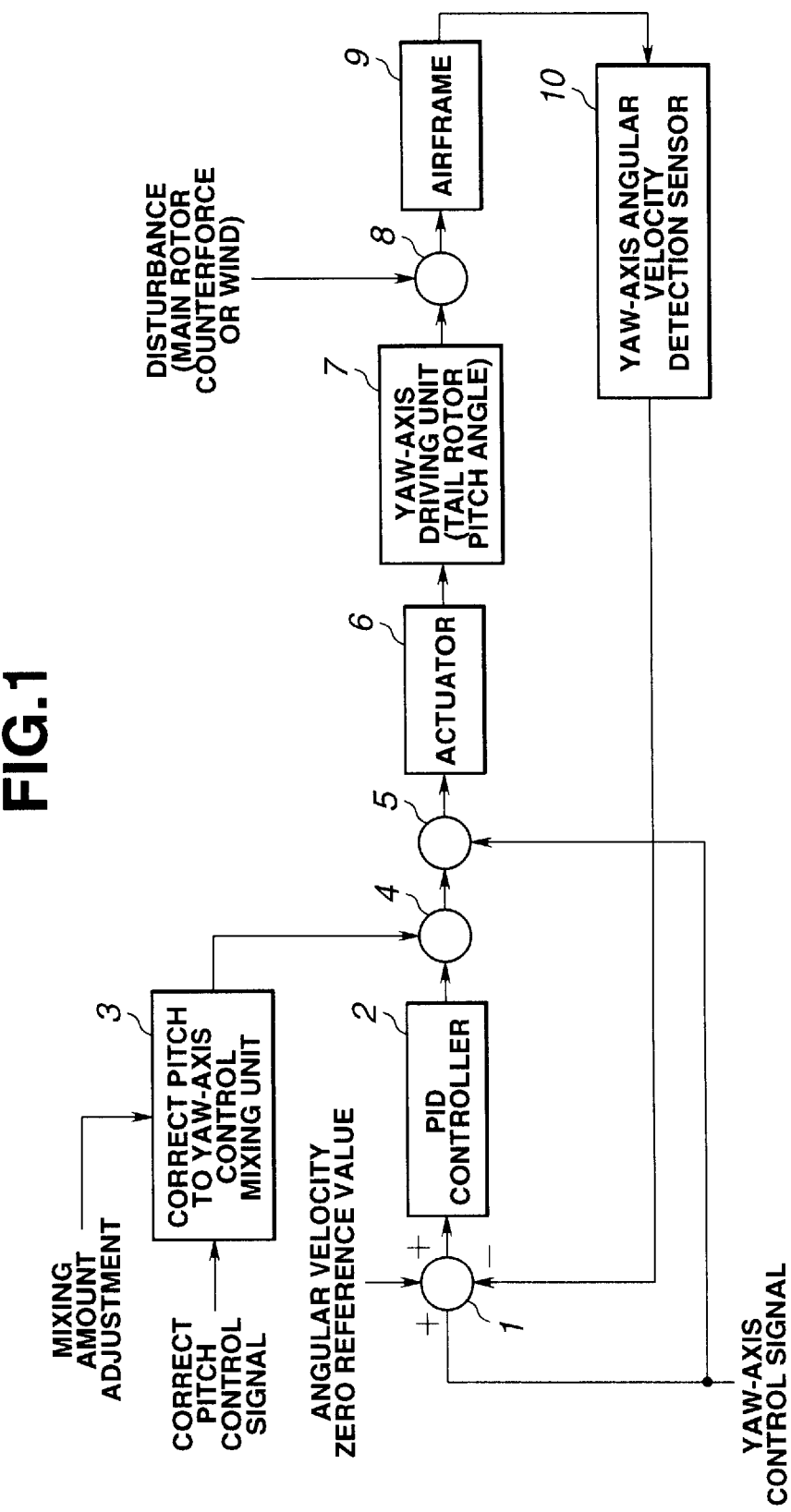
FIG. 1 is a block diagram illustrating a gyroscope for a remote-controlled helicopter according to an embodiment of the present invention.
Figure 2:
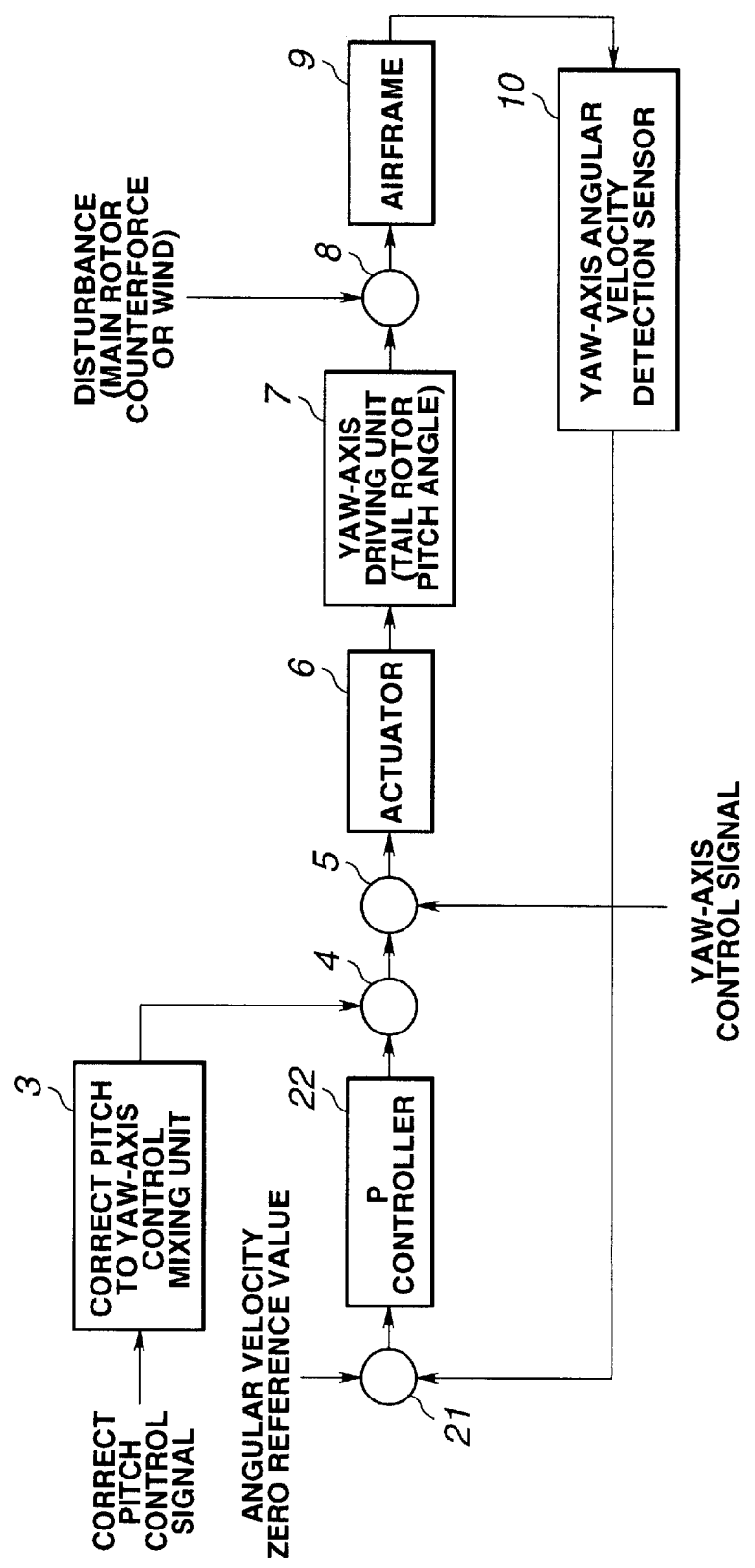
FIG. 2 is a block diagram illustrating a conventional gyroscope employing the P-control system for a model helicopter.

FIG. 1 is a block diagram showing a gyroscope for a remote-controlled helicopter according to an embodiment of the present invention. In FIG. 1, like numerals represent the same constituent elements as those in FIG. 2. Hence, the duplicate description will be omitted here.

Referring to FIG. 1, reference numeral 1 represents an addition point; and reference numeral 2 represents a PID controller. An angular velocity detection signal from the yaw-axis angular velocity sensor 10 is added to the yaw-axis control signal from the controlling gear and an angular velocity zero reference value at the addition point 1. The resultant error signal (error) is input to the PID controller 2.

The correct-pitch to yaw-axis control mixing unit 3 receives the correct pitch control signal and then creates a mixing signal. The mixing signal is added to the control output signal from the PID controller 2 at the addition point 4. Moreover, the addition point 5 again adds the resultant signal to the yaw-axis control signal and then inputs the thus-obtained signal to the actuator 6. In response to the output signal from the actuator 6, the yaw-axis driving unit 7 adjusts the pitch angle of the tail rotor to vary the drive force around the yaw-axis. The output signal from the yaw-axis driving unit 7 is added to the counter force of the main rotor or a disturbance factor such as wind at the virtual addition point 8. Then the resultant data is transmitted to the airframe 9. The yaw-axis angular velocity sensor 10 detects the angular velocity around the yaw-axis of the airframe 9 and then feeds the detection output signal back to the addition point 1.

In the above-mentioned configuration, the mixing amount is fed back or forwarded to the yaw-axis control system according to changes in correct pitch operation. As a result, a suitable control signal can be added to the yaw-axis control system under even the PID control, so that the auxiliary operation of the gyroscope can be implemented and the response characteristic can be improved. Since the mixing amount of the correct pitch to yaw-axis control mixing unit 3 depends on the characteristics of a model helicopter, the mixing amount adjusting mechanism may be mounted to adjust the characteristics of the model helicopter to an optimum value.

According to the above embodiment, in order to improve the responsivity, the feed-forward control is performed with the yaw-axis control signal by inputting the yaw-axis control signal from the manipulation side to the addition point 5 on the output side of the PID controller 2, in addition to the addition point 1 on the input side of the PID controller 2. However, this feed-forward control may be eliminated.

In the above embodiment, the present invention has been applied to a model helicopter. However, the present invention may be applied to a remote-controlled helicopter for aerial photographing or to a remote-controlled helicopter for sprinkling agricultural chemicals.

As understood from the above description, the present invention has the advantage in that the yaw-axis control characteristics of a remote-controlled helicopter can be improved against a disturbance factor such as wind under the PID control. Moreover, variations in counter torque to the yaw-axis due to the correct pitch operation can be improved so that the responsivity of the yaw-axis control can be improved.

What is claimed is:

1. A gyroscope for a remote-controlled helicopter, wherein a yaw-axis of the remote-controlled helicopter is subjected to PID control, comprising:

a yaw-axis control angular velocity detection sensor;

a PID controller; and a correct-pitch to yaw-axis mixing unit; and said PID controller inputting an error between a yaw-axis angular velocity reference value and a yaw-axis control signal and an error between the yaw-axis angular velocity reference value and an output signal from said yaw-axis angular velocity detection sensor;

wherein a counter torque to said yaw-axis due to said correct pitch is prevented by outputting an output signal from said PID controller, an output signal from said correct-pitch to yaw-axis control mixing unit, and said yaw-axis control signal to a yaw-axis driving system.

2. The gyroscope of claim 1, further comprising:

said yaw-axis control angular velocity detection sensor outputting an angular velocity detection signal;

said correct-pitch to yaw-axis control mixing unit outputting a mixing signal;

said PID controller configured to provide a control signal derived from an error between an angular velocity reference value and a yaw-axis control signal and an error between said angular velocity reference value and said angular velocity detection signal;

a summation device configured to add said control signal, said mixing signal and said yaw-axis control signal, and outputting a sum signal;

an actuator configured to produce an actuation signal from said sum signal output by said summation device; and said yaw-axis driving system comprises said summation device, said actuator, and a yaw-axis driving unit.

3. The gyroscope claim 1, further comprising:

said yaw-axis control angular velocity detection sensor outputting an angular velocity detection signal;

said correct-pitch to yaw-axis control mixing unit outputting a mixing signal;

said PID controller configured to provide a control signal derived from an error between an angular velocity reference value and a yaw-axis control signal and an error between said angular velocity reference value and said angular velocity detection signal;

a summation device configured to add said control signal and said mixing signal, and outputting a sum signal;

an actuator configured to produce an actuation signal from said sum signal output by said summation device; and said yaw-axis driving system comprises said summation device, said actuator, and a yaw-axis driving unit.

* * * * *